Nov. 17, 1942. W. SCHWENECKE 2,301,977
DRILL
Filed July 25, 1940
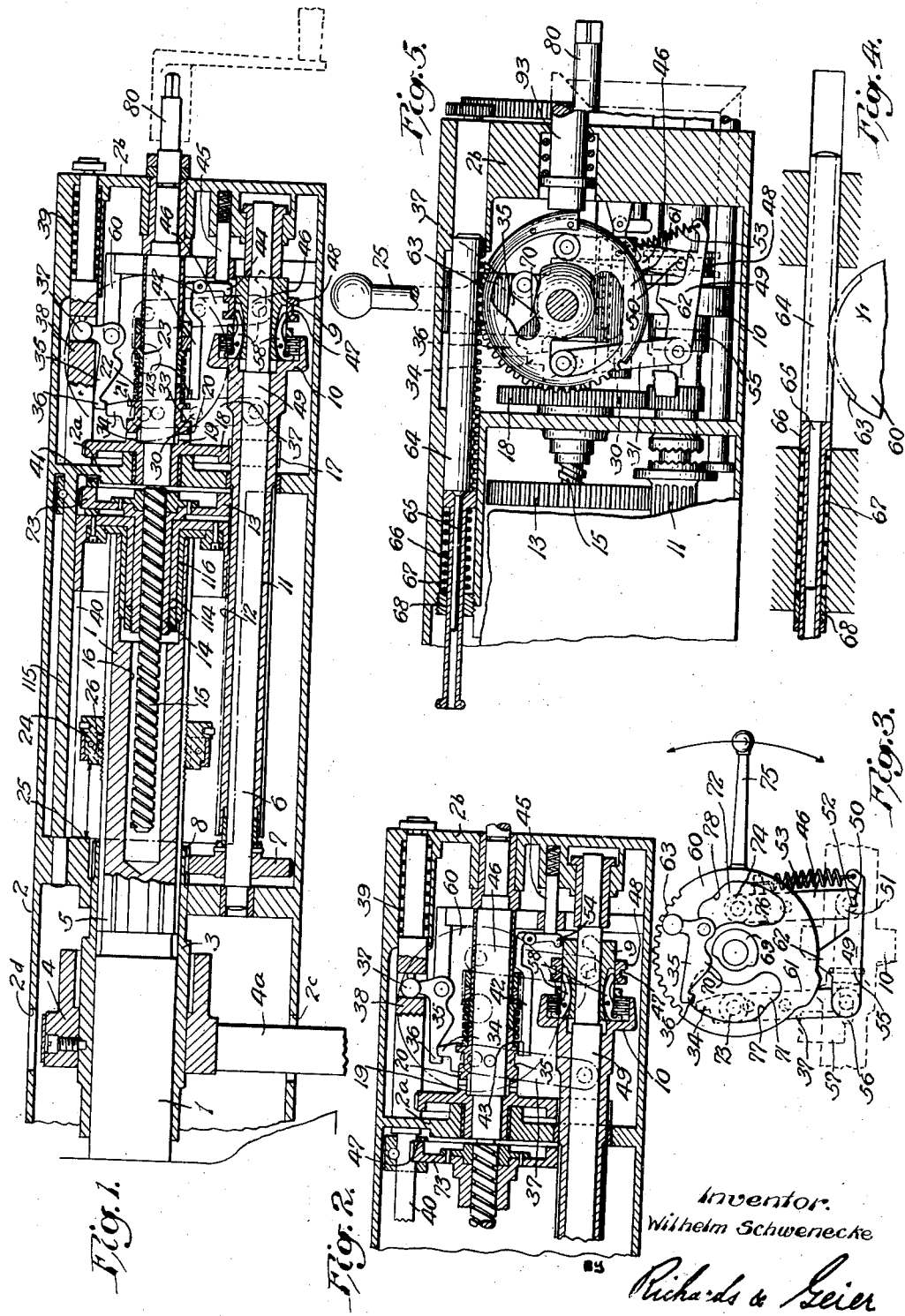
Inventor:
Wilhelm Schwenecke
Richards & Geier
Attorneys.

Patented Nov. 17, 1942

2,301,977

UNITED STATES PATENT OFFICE 2,301,977

DRILL

Wilhelm Schwenecke, Kothen, Germany; vested in the Alien Property Custodian

Application July 25, 1940, Serial No. 347,406
In Germany March 13, 1939

19 Claims. (Cl. 77—32)

This invention relates to a drill and refers more particularly to a boring or drilling tool having an automatic feed movement and a quick return movement.

An object of the present invention is the provision of a boring or drilling tool having an automatic feed movement and quick return movement and so constructed that it can be used for a great variety of different purposes and can be set to operate in any desired direction.

Another object is the provision of a boring tool of such construction that a plurality of these tools can be conveniently combined to constitute a single multi-spindle drilling machine.

A further object is the provision of a boring tool all of the operative movements of which take place automatically.

A still further object of the present invention is the provision of a driving device for a boring tool which makes it possible to adjust the position of the tool by hand and at the same time causes the tool to carry out automatically its feed movement and its quick return movement.

Yet another object is the provision of a device which is switched on automatically to cause a boring tool to carry out a quick return movement after its feed movement has been brought to an end, while at the end of the return movement said device and the entire drive are automatically switched off.

Another object of the present invention is the provision of a boring tool which is constructed as compactly as possible particularly as far as its width is concerned, so that a plurality of these tools when operating simultaneously, can drill holes situated at a small distance one from the other.

A further object of the present invention is the provision of a drill having driving means and a device for switching and steering the drill, which are so constructed that the drill can be conveniently adjusted and switched on and off in many different ways and that it requires little space in directions transverse to the direction of its operation.

In accomplishing the above and other objects of the present invention, it was found advisable to provide a drill having a feed drive which consists of two interconnected driving elements rotating with different speeds and situated within the spindle of the drill. The drill spindle is preferably eccentrically located in the casing of the tool. The switching and steering means for the feed movement are situated directly behind the drill spindle and are so mounted upon a front surface of the tool casing that they do not require more space in the transverse direction than is necessary for the other parts of the tool. The casing of the tool may be of rectangular form and provided with smooth outer surfaces, so that the tool can be conveniently set to operate in vertical, horizontal or any inclined positions, and so that many of such tools can be conveniently combined into a multiple-spindle unit.

In accordance with the present invention, two power transmitting devices are included in the feed drive of the tool. One of these devices is used to drive a feed spindle which actuates the drill spindle. The other device is used for operating a driving element which is so connected with the drill spindle that it can rotate relatively thereto but cannot move longitudinally thereof. This driving element cooperates with the feed spindle. The two power transmitting devices rotate with different speeds, and the difference between the two speeds determines the speed of the feed movement of the drill spindle.

Furthermore, in accordance with the present invention, the difference in the ratios of the two power-transmitting devices is so selected that the feed spindle rotates with a speed which is greater than that of the driving element cooperating therewith and connected with the drill spindle. Thus the quick return movement of the drill spindle is accomplished by a comparatively simple arrangement.

The present invention is also concerned with the transmission of the drive for the feed spindle and for the driving element cooperating therewith to the drill spindle which is moved axially with different velocities, with the interruption of this drive, with means for actuating the drill spindle, and with the switching and steering of these means and of the driven elements of the tool, automatically as well as manually.

The invention will appear more clearly from the following detailed description when taken in connection with the accompanying drawing showing by way of example a possible embodiment of the inventive idea.

In the drawing:

Figure 1 shows a drill constructed in accordance with the principles of the present invention in longitudinal section.

Figure 2 is similar to Figure 1 and shows a part of the drill illustrated in Figure 1 in a different position, Figure 3 is another sectional view of a detail; and Figure 4 is a sectional view of a detail amplifying Figure 1.

Figure 5 shows the switching mechanism of the drill in longitudinal section.

Figure 1 shows a shaft or tool spindle 1, the lower end of which carries a drill steel not shown in the drawing. The tool spindle 1 is rotatably mounted in a casing 2 of rectangular cross-section and is located eccentrically in relation to the cross-section.

The drive for the tool spindle 1 includes a pulley 4 which is firmly connected with a tube 3. A belt 4a embraces the pulley 4 and is actuated by the main drive of the boring machine which is not illustrated in the drawing. The belt 4a passes through an opening 2c provided in the casing 2.

Another opening 2d is provided in the casing 2 opposite the opening 2c, so that any of the sides of the drill may be directed toward the main drive.

The tube 3 is so connected with the tool spindle 1 that a rotation of the tube 3 is transmitted to the tube spindle 1, while the latter is movable longitudinally in relation to the tube 3. This is achieved by a spline shaft gear 5 which transmits the turning movement of the tube 3 to the tool spindle 1.

A driving shaft 6 extends parallel to the axis of the tool spindle 1 in the casing 2. One end of the shaft 6 carries a gear 7 meshing with a toothed crown 8 integral with the tube 3.

The opposite end of the shaft 6 carries the element 9 of a disc clutch 9, 10. The other clutch element 10 is rigidly connected with a hollow shaft 11 which encloses the shaft 6 and which is also mounted in the casing 2.

The hollow shaft 11 is provided with elongated teeth 12 extending over the major part of the shaft. The length of the teeth is determined by the extent of the feed movement of the spindle 1.

A gear 13 meshes with the teeth 12 of the shaft 11 and is firmly connected with a nut 14 having inner screw threads which engage the outer screw threads of a threaded spindle 15. The threaded spindle 15 is situated within a bore 16 of the tool spindle 1.

The nut 14 is so mounted in the hub of a guiding piston 114 that it can rotate relatively to the piston but cannot move longitudinally thereof.

The piston 114 is situated within a guiding cylinder 115 which encloses the tool spindle 1. A sleeve 116 is firmly connected with the piston 114 and with the tool spindle 1, and is used to hold the piston 114 in the tool spindle 1. The shaft 6 is situated within a cut out portion provided in the cylinder 115.

The threaded spindle 15 is so mounted in a transverse inner wall 2a and the upper front wall 2b of the casing 2 that it can rotate relatively to these walls but cannot move longitudinally thereof.

In addition to the teeth 12 the hollow shaft 11 also carries a gear 17 meshing with a gear wheel 18 which is loosely mounted upon the spindle 15.

The hub of the gear wheel 18 is firmly connected with the element 19 of a coupling 19, 20. The other element 20 of this coupling constitutes a sleeve which is so keyed upon the spindle 15 that it cannot rotate relatively thereto but is movable longitudinally of the spindle 15.

A strong coiled spring 22 presses with its one end against a toothed collar 21. The opposite end of the spring 22 is pressed against a ring 23 which is so keyed upon the spindle 15 that it cannot rotate relatively thereto but can be adjusted in the longitudinal direction of the spindle by threaded nut rings or the like.

A ring 24 having inner screw threads is screwed upon the spindle 1 a portion of which is provided with outer screw threads. Therefore, the ring 24 which participates in the feed movement of the spindle can be adjusted and shifted longitudinally of the spindle.

The ring 24 carries a ring 26 which is supported by ball bearings in the ring 24. In the course of the feed movement of the spindle 1 and the ring 24, the ring 26 will strike the surface 25 of the casing 2.

The device which causes the tool spindle 1 to carry out its various movements in the required sequence, is situated in the front or head portion of the casing directly behind the spindle 1 and is so constructed that it does not occupy more space in directions transverse to the longitudinal direction of the spindle 1 than all the other parts of the tool.

The object of this device is to switch on and off the coupling 9, 10 for the feed drive and the coupling 19, 20 for the threaded spindle 15 while the tool spindle 1 is operated, in a manner which will cause the spindle 1 to carry out the necessary movements automatically.

The device includes a two armed lever 31 which is rotatably mounted upon a pin 30 and is in engagement with an annular groove 33 provided in the coupling sleeve 29. The upper end 34 of the lever 31 is situated in the path of movement of a hook 36 constituting a part of an angular lever 35. The arm 37 of the lever 35 projects into an opening formed in a connecting rod 38, so that the lever 35 is connected with the rod 38. The rod 38 is engaged by a spring 39 and is so mounted in the casing 2 that it can move longitudinally therein.

The rod 38 includes a continuing narrower portion 40 which carries an adjustable abutment 41. The abutment 41 is situated in the path of movement of the gear wheel 13 which moves longitudinally along with the tool spindle 1.

A second angular lever 42 is also pivotally mounted intermediate its ends in the casing 2. One end of the lever 42 carries a tooth 43 which is situated close to the gear wheel 21 mounted upon or integral with the sleeve 20.

The opposite end 44 of the angular lever 42 is adapted to engage a pin or bolt 45, which is mounted in the front wall 2b of the casing 2 and which is subjected to the pressure of a spring.

A two armed lever 46 is also pivotally mounted in the casing 2, as is shown more clearly in Figures 1 and 3 of the drawing.

One of the arms of the lever 46 is in engagement with an annular groove 47 of a sleeve 48 which is so mounted upon the coupling element 9 that it is movable longitudinally thereof.

The sleeve 48 cooperates with a plurality of levers 58 which are adapted to engage the disc elements of the coupling 9, 10.

A link 49 shown best in Figures 2 and 3 is pivotally connected with that end of the lever 31 which is situated opposite the projection 34. The other end of the link 49 is adapted to project into a cavity 51 (Figure 3) provided in a pin 50 which connects the lever 46 with the sleeve 48. This is accomplished by providing the link 49 with a projection 52 which can be introduced into the cutout portion 51.

A spring 53 is used to hold the link 49 in the position shown in Figure 3. One end of the spring 53 is attached to an end of the link 49, while the opposite end of the spring 53 is connected to a projection constituting a part of the casing.

The pin 50 is also connected with a link 54 carrying a coupling shoe 55 (Figures 3 and 5) which is adapted to engage the front surface of the coupling element 10. The coupling shoe 55 is also connected with a guiding pin 56 having inclined surfaces engaging a pin 57 which is mounted transversely in the casing 2 and which is subjected to the action of a spring, not shown in the drawing.

A cam disc or steering disc 60 is rotatably mounted in the head portion of the casing 2 close to the switching elements. The disc 60 is provided with a projection or cam 61 which is situated upon the outer circumference of the disc 60 and is adapted to engage the projecting portion 62 of the link 49.

Another portion of the outer circumference of the disc 60 carries teeth 63 which mesh with the teeth of a threaded rod or worm 64, shown in Figure 4. The rod 64 is so mounted in the head portion of the casing 2 that it can move in its longitudinal direction. A continuing narrower portion 65 of the rod 64 is situated within a tube 66 which is engaged by one end of a spring 67. The opposite end of the spring 67 presses against the inner wall 2a constituting a part of the casing 2 and shown in Figure 1.

One end of the tube 66 carries a ring 68 which is used as a stop and which is pressed against the casing by the spring 67, in the position shown in Figure 4.

The disc 60 has a hub having the form of a cam 69 which is adapted to engage a projection 70 of the angular lever 35.

The disc 60 is also provided with two cut-out portions 71 and 72, the inner surfaces of which cooperate with rollers 73 and 74 mounted upon the levers 31 and 46, respectively. The cut-out portion 71 is provided with an inner cam surface 77 while the cut-out portion 72 has inner cam surfaces 76 and 78.

A handle 75 is firmly connected with the steering disc 60 and projects outside of the front surface of the casing 2.

The end 80 of the threaded spindle 15 also projects outside of the front surface of the casing 2 and may be provided with a handle 81 by means of which the steering disc 60 may be operated to provide any desired axial adjustment of the tool spindle 1 in relation to the work piece after the feed drive has been switched off.

The operation of the spindle drive is as follows:

The main drive of the machine which is not shown in the drawing, causes a rotation of the endless belt 4a which passes over the pulley 4. The rotation of the pulley 4 is transmitted to the tool spindle 1 by the gear 5 and is also transmitted by the toothed crown 8 which is integral with the pulley 3, by the gear 7 meshing with the crown 8, and by the shaft 6 carrying the gear 7, to the coupling sleeve 9 which is mounted upon the shaft 6. If the coupling 9, 10 is in its operative engaged position, then the rotation of the shaft 6 will be transmitted by the coupling 9, 10 to the hollow shaft 11.

The rotation of the shaft 11 is transmitted in the first place, by the teeth 12 to the gear-wheel 13. In the second place, the rotation of the shaft 11 is transmitted by the gear-wheel 17 to the gear-wheel 18.

If the coupling 19, 20 is in its operative engaged position, then the rotation of the gear-wheel 18 will be transmitted to the spindle 15. The gear-wheel 13 will cause the nut 14 to rotate in the same direction.

The tool is so constructed that the transmission ratio between the gears 12 and 13 is greater than that between the gears 17 and 18. Consequently, the spindle 15 will rotate with greater speed than the nut 14. This results in an axial movement of the nut 14 in the direction of the feed movement which is indicated by the arrow $x$ in Figure 1, provided that the pitch of the threads of the spindle 15 has been properly selected in relation to the direction of rotation of the tool spindle 1.

Since the nut 14 is connected with the tool spindle 1, the latter is moved in the direction of its longitudinal axis toward the work piece. Thus, the feed movement of the spindle 1 takes place.

This feed movement is brought to an end when the ring 26 which is mounted upon the spindle 1 by means of the ring 24 is caused to strike the surface 25 of the casing 2. The tool spindle 1 continues to rotate after the engagement between the surface 25 and the ring 26 has taken place. However, since the ring 26 is connected by ball bearings with the ring 24, the rotation of the spindle 1 will merely cause a rolling frictional movement between the ring 24 and the ring 26.

The force creating the feed movement of the tool spindle 1 thus finds a resistance which is greater than the tension of the spring 22 which is situated between the coupling 19, 20 and the ring 23. The tension of the spring 22 is so selected that it can transmit only a turning movement of a predetermined value. This value is now exceeded and, therefore, the spring 22 will disengage the coupling 19, 20 which is provided with teeth having a corresponding inclination, shifting the coupling element 20 out of its operative position and moving it axially. As a result of this disengagement of the coupling 19, 20, the operative connection between the gear 18 and the spindle 15 will be interrupted and the gear 18 will rotate loosely upon the spindle 15. Then the movement of the spindle 15 will be brought to an end. The spindle 15 will be locked by the lever 42, as will be described in detail hereinafter.

Since the nut 14 continues to carry out its rotary movement and since the spindle 15 is now immovable, the nut 14 will move axially upon the spindle 15 in a direction opposed to that of the arrow $x$. The tool spindle 1 which is connected with the nut 14, will move along with it and will carry out its return movement, since the transmission ratio between the gears 12 and 13 which remain in operative engagement is greater than the transmission ratio between the gears 17 and 18 which are now disconnected.

Since, on the one hand, the difference between transmission ratio of the drive for the nut 14 and the transmission ratio of the drive for the spindle 15 has been purposely selected as small, while on the other hand the speed difference between the rotating spindle 15 and the immovable spindle 15 is very great, the return movement of the nut 14 and consequently, of the tool spindle 1 is considerably faster than the feed movement. Therefore, the described arrangement makes it possible to achieve a quick return movement of the tool spindle 1.

The operation of the switching devices is as follows:

As already stated, the coupling 19, 20 is disconnected by the spring 22 when the ring 26 is brought into engagement with the surface 25 of the casing 2. The movement of the coupling element 20 into its disengaged position causes the lever 31 which is in engagement with the element 20 to move into the position shown in Figure 2. The teeth of the collar 21 are then brought into engagement with the tooth 43 of the angular lever 42, so that the coupling sleeve 20 and, consequently, the threaded spindle 15 are prevented from rotating any further. The nut 14 which is driven by the gears 12 and 13 is the sole element which continues to carry out a rotary movement and, due to the selection of the transmission ratios of the gears 12, 13 and 17, 18, the tool spindle 1 will carry out its return movement.

At the same time, the projection 34 of the lever 31 is moved below the hook 36 of the angular lever 35. The spring 39 holds the rod 38 and the lever 35 connected therewith in this position, which is shown in Figure 2. The coupling 9, 10 for the feed drive which, at that time, transmits the return movement, is placed simultaneously by the lever 31 in a position in which it is ready to stop that return movement. This is accomplished by transmitting the swinging movement of the lever 31 to the link 49 and thereby causing the spring 53 to insert the projection 52 of the link 49 into the cut out portion 51 of the bolt 50. This connects the means actuating the coupling 9, 10 for the feed drive with the other switching means of the tool.

At the completion of the return movement of the tool spindle 1, the gear wheel 13 strikes the abutment 41 mounted upon the portion 40 of the rod 38 and thereafter, the abutment 41 and the rod 38 are moved along with the wheel 13, whereby the spring 39 is compressed. The lengthwise movement of the rod 38 is transmitted to the angular lever 35 and the projection 34 of the lever 31 is freed by the hook 36 which is integral with the lever 35.

Then, the lever 31 is moved by the spring 22 into its original position shown in Figure 1, and in the course of this movement the lever 31 brings the coupling 19, 20 into its engaged position. The opposite end of the angular lever 31 moves the link 49 and causes the projection 52 of this link to shift the sleeve 48. The sleeve 48 actuates the levers 58 and this results in the disengagement of the disc elements of the coupling 9, 10, so that this coupling is brought into its disengaged position. This operation is speeded by the brake or coupling shoe 55 which is movable along with the sleeve 48 and which is pressed by the spring actuated pin 57 against the front surface of the coupling element 10.

At the same time, the sleeve 48 swings the angular lever 42 in such manner that its tooth 43 is moved out of engagement with the toothed collar 21 which is integral with the sleeve 20. This frees the threaded spindle 15 for rotation. It is now possible to turn the spindle 15 manually by means of a crank without switching off the drive, and therefore the tool spindle 1 can be shifted axially to adjust the position of the drill steel in relation to a new workpiece.

The steering disc 60 operates as follows:

If at the end of the return movement the steering disc 60 is turned manually in the direction of the arrow $y$ shown in Figure 3, its cam 61 is brought into engagement with the projecting portion 62 of the link 49. The cam 61 moves the link 49 away from the coupling pin 50, so that the projection 52 of the link 49 is brought out of engagement with the cut out portion 51 of the pin 50. This frees the lever 46 and the sleeve 48 of the coupling element 9, so that the coupling 9, 10 can be switched on again.

When the disc 60 is turned still further in the same direction, namely in the direction of the arrow $y$, the cam surface 76 of the cut out portion 72 will engage the roller 74 and will move this roller and the lever 46 in such manner, that the latter will swing the lever 58 and thereby cause the disc coupling 9, 10 to move into an engaged position (Figs. 1 and 2). Then the gear elements 12, 13, and 17, 18 are switched on again into the drive of the machine.

In the course of the described rotation of the disc 60 in the direction of the arrow $y$, the cam 69 raises the angular lever 35 and then the hook 36 frees the upper end 34 of lever 31, so that the spring 22 can press the coupling element 20 against the coupling element 19 connected with the wheel 18. This causes the spindle 15 to participate again in the rotary movement and thus brings forth the automatic forward movement of the tool spindle 1.

The described movements of the steering disc 60 has no effect upon the lever 31 carrying the roller 73. However, since the teeth 63 of the disc 60 mesh with the teeth of the rod 64 (Fig. 4), the rod 64 was moved in relation to the casing 2a and the spring 67 was compressed. If the operator releases the hand lever 75, the spring 67 will move the disc 60 back into its original position. The tube 66 and the portions 65 of the rod 64 are so dimensioned that the spring 67 moves the disc 60 only to its middle position which is shown in Fig. 3.

If the operator turns the lever 75 along with the disc 60 in the direction of the arrow $z$ (Fig. 3), the cam surface 77 of the cut out portion 71 will engage the roller 73 of the lever 31. The movement of the lever 31 will operate the coupling element 20 (Fig. 1) which is connected therewith, and will disengage the coupling 19, 20 and also lock the lever 31 by means of the hook 36 of the lever 35. This will disengage the gears 17, 18 and, as above stated, will switch on the mechanism causing the quick return movement of the tool spindle 1.

If the disc 60 is turned still further in the direction of the arrow $z$, the cam surface 78 of the cut out portion 72 will engage the roller 74 carried by the lever 46 and will swing this lever causing the disengagement of the coupling 9, 10. Consequently, the entire driving mechanism for the tool spindle will be stopped.

Thereupon, the steering disc 60 can be turned back into its original position by means of the hand lever 75 and by turning the lever 75 further in the direction of the arrow $y$, the feed drive can be switched on again.

Since the feed drive constructed in accordance with the present invention consists of two driving elements which are in engagement with each other and which rotate with different speeds, and since this drive is situated within the tool spindle, the dimensions of the tool in planes transverse to the direction of feed movement are very small. This makes it possible to use the tool in different locations and for a large variety of purposes. Furthermore, the described construction makes it possible to carry out the feed drive and the quick return movement of the spindle with the smallest possible expenditure of power.

Due to the small width of the tool, a large number of these tools may be used simultaneously to drill bore holes situated at short distances from each other, and, in general, a large number of the tools may be conveniently combined into a single machine. This combination of a plurality of tools into a single unit is also facilitated by the fact that the means switching and operating the feed drive are situated directly behind the tool spindle, namely, upon a front surface of the tool casing in the direction of the rearward continuation of the tool spindle.

All the driving elements as well as the steering and switching means of the tool are so selected, formed and arranged, that the tool casing may be of rectangular cross section and be provided with flat smooth side surfaces having no projecting portions or the like. This furthers the usefulness of the tool for a variety of purposes.

The fact that the axis of the tool spindle is eccentrically located in the casing makes it easier to combine several tools with different distances between their spindle axes into a single machine which can drill holes situated closely one to the other.

The feed drive constructed in accordance with the principles of the present invention makes it possible to utilize a very small number of parts to provide an automatic feed movement and a return movement which is carried out with a much greater speed. The switching and steering means which cause all the necessary operations of the tool, said operations being performed automatically to the greatest possible extent, require only a small number of parts, so that all these parts can be assembled within the smallest possible space and will carry out the switching and steering operations with very little danger of breakage or interruptions.

Furthermore, the switching and steering means are so selected, constructed and arranged that the tool requires very little attention or skill on the part of the operator in spite of the large number of switching and steering operations which are being performed, particularly since all switching operations are carried out by manipulating a single hand lever.

It is apparent that the specific illustrations shown above have been given by way of illustration and not by way of limitation and that the structures above described are subject to wide variation and modification, without departing from the scope or intent of the invention, all of which variations and modifications are to be included within the scope of the present invention.

What is claimed is:

1. A drill, comprising a hollow tool spindle, two interengaging rotary driving elements situated within said hollow tool spindle, one of said elements being operatively connected with said spindle, separate means connected with said driving elements for simultaneously rotating them with different speeds to cause said one element and said tool spindle to carry out a feed movement, and means stopping the rotation of the other one of said elements to cause said one element and said tool spindle to carry out a quick return movement.

2. A drill, comprising an elongated casing having a front portion, a hollow tool spindle situated eccentrically within said casing, two interengaging rotary driving elements situated within said hollow tool spindle, one of said elements being operatively connected with said spindle, separate means connected with said driving elements for simultaneously rotating them with different speeds to cause said one element and said tool spindle to carry out a feed movement, means stopping the rotation of the other one of said elements to cause said one element and said tool spindle to carry out a quick return movement, and means situated within said casing directly behind said spindle adjacent to said front portion and connected with the first-mentioned and the second-mentioned means for causing the tool spindle to carry out automatically its quick return movement after the completion of the feed movement.

3. A drill, comprising a hollow tool spindle, two interengaging rotary driving elements situated within said hollow tool spindle, means connected with said tool spindle for rotating the same, driving means situated adjacent to said tool spindle and operatively connected therewith, one of said driving elements being operatively connected with said spindle, separate means operatively connected with said driving means and actuated thereby for simultaneously rotating said driving elements with different speeds to cause said one element and said tool spindle to carry out a feed movement, and means stopping the rotation of the other one of said elements to cause said one element and said tool spindle to carry out a quick return movement.

4. A drill, comprising a hollow tool spindle, a threaded spindle within said tool spindle, a nut rotatably mounted in said tool spindle and meshing with said threaded spindle, said nut being movable longitudinally along with said tool spindle, separate gear drives connected with said threaded spindle and said nut for rotating said threaded spindle with a greater speed than said nut to cause said nut and said tool spindle to carry out a feed movement, and means stopping the rotation of said threaded spindle to cause said nut and said tool spindle to carry out a quick return movement.

5. A drill, comprising a hollow tool spindle, a threaded spindle within said tool spindle, a rotary nut connected with said tool spindle and situated within the tool spindle, said threaded spindle meshing with said nut, a gear drive connected with said nut for rotating the same, another gear drive having a different transmission ratio and including a coupling connected with said threaded spindle; and means connected with said coupling for disengaging the same to stop the rotation of said threaded spindle and cause said nut and said tool spindle to carry out a quick return movement.

6. A drill, comprising a hollow tool spindle, a threaded spindle within said tool spindle, a rotary nut connected with said tool spindle and situated within the tool spindle, said threaded spindle meshing with said nut, a gear drive connected with said nut for rotating the same, another gear drive having a different transmission ratio and including a coupling connected with said threaded spindle, and resilient means connected with said coupling and holding it in an engaged position, the difference in the transmission ratios of said drives causing said nut and said tool spindle to carry out a feed movement, the force of said resilient means being smaller than the force of said tool spindle in the course of its feed movement; and means causing said resilient means to disengage said coupling to stop the rotation of said threaded spindle and cause said nut and said tool spindle to carry out a quick return movement.

7. A drill, comprising a hollow tool spindle, two interengaging rotary driving elements situated within said hollow tool spindle, one of said elements being operatively connected with said spindle, separate means connected with said driving elements for simultaneously rotating them with different speeds to cause said one element and said tool spindle to carry out a feed movement, a ring adjustably mounted upon said tool spindle, a casing enclosing said tool spindle and having a portion extending in the path of movement of said ring to stop said feed movement, and means stopping the rotation of the other one of said elements to cause said one element and said tool spindle to carry out a quick return movement.

8. A drill, comprising a hollow tool spindle, a threaded spindle within said tool spindle, a rotary nut connected with said tool spindle and situated within the tool spindle, said threaded spindle meshing with said nut, a gear drive including a coupling connected with said nut, another gear drive having a different transmission ratio and including another coupling connected with said threaded spindle; and means operatively interconnecting the two couplings and adapted to be actuated by the movement of said tool spindle for disengaging the second-mentioned coupling to stop the rotation of said threaded spindle and cause said nut and said tool spindle to carry out a quick return movement.

9. A drill, comprising a hollow tool spindle, a threaded spindle within said tool spindle, a rotary nut connected with said tool spindle and situated within the tool spindle, said threaded spindle meshing with said nut, a gear drive including a coupling connected with said nut, another gear drive having a different transmission ratio and including another coupling connected with said threaded spindle, means connected with the second-mentioned coupling for disengaging the same to stop the rotation of said threaded spindle and cause said nut and said tool spindle to carry out a quick return movement, a hooked lever, and means connected with said hooked lever and operated during the return movement of the tool spindle for maintaining the second-mentioned coupling in its disengaged position.

10. A drill, comprising a hollow tool spindle, a threaded spindle within said tool spindle, a rotary nut connected with said tool spindle and situated within the tool spindle, said threaded spindle meshing with said nut, a gear drive including a coupling connected with said nut, another gear drive having a different transmission ratio and including another coupling connected with said threaded spindle, means connected with the second-mentioned coupling for disengaging the same to stop the rotation of said threaded spindle and cause said nut and said tool spindle to carry out a quick return movement, a hooked lever, another lever having a projection adapted to be engaged by the hook of the first-mentioned lever, means connected with the second-mentioned lever for maintaining the second-mentioned coupling in its disengaged position when the projection of the second-mentioned lever is engaged by the hook of the first-mentioned lever, and means actuated by said tool spindle for moving the first-mentioned lever away from the second-mentioned lever at the end of the return movement to bring the second-mentioned coupling into its engaged position.

11. A drill, comprising a hollow tool spindle, a threaded spindle within said tool spindle, a rotary nut connected with said tool spindle and situated within the tool spindle, said threaded spindle meshing with said nut, a gear drive including a coupling connected with said nut, another gear drive having a different transmission ratio and including another coupling connected with said threaded spindle, means connected with the second-mentioned coupling for disengaging the same, and means connected with the last-mentioned means for preventing the rotation of said tool spindle when the second-mentioned coupling is disengaged.

12. A drill, comprising a hollow tool spindle, a threaded spindle within said tool spindle, a rotary nut connected with said tool spindle and situated within the tool spindle, said threaded spindle meshing with said nut, a gear drive including a coupling connected with said nut, another gear drive having a different transmission ratio and including another coupling connected with said threaded spindle, means connected with the second-mentioned coupling for disengaging the same to cause said nut and said tool spindle to carry out a quick return movement, and means operatively connecting the last-mentioned means with the first-mentioned coupling when the second-mentioned coupling is disengaged.

13. A drill, comprising a hollow tool spindle, a threaded spindle within said tool spindle, a rotary nut connected with said tool spindle and situated within the tool spindle, said threaded spindle meshing with said nut, a gear drive including a coupling connected with said nut, means connected with said coupling for actuating the same, another gear drive having a different transmission ratio and including another coupling connected with said threaded spindle, means connected with the second-mentioned coupling for actuating the same, and means interconnecting the means actuating the two couplings for disengaging the first-mentioned coupling when the second-mentioned coupling is moved into an engaged position.

14. A drill, comprising a hollow tool spindle, a threaded spindle within said tool spindle, a rotary nut connected with said tool spindle and situated within the tool spindle, said threaded spindle meshing with said nut, a gear drive including a coupling connected with said nut, means connected with said coupling for actuating the same, another gear drive having a different transmission ratio and including another coupling connected with said threaded spindle, means connected with the second-mentioned coupling for actuating the same, means connected with the means actuating the second-mentioned coupling for preventing the rotation of said tool spindle when the second-mentioned coupling is disengaged, and means operatively connecting the last-mentioned means with the means actuating the first-mentioned coupling to permit the rotation of said tool spindle when the first-mentioned coupling is disengaged.

15. A drill, comprising a hollow tool spindle, a threaded spindle within said tool spindle, a rotary nut connected with said tool spindle and situated within the tool spindle, said threaded spindle meshing with said nut, a gear drive including a coupling connected with said nut, means connected with said coupling for actuating the same, another gear drive having a different transmission ratio and including another coupling connected with said threaded spindle, means connected with the second-mentioned coupling for actuating the same, and manually operated means operatively connected with the means actuating the two couplings for operating the same.

16. A drill, comprising a hollow tool spindle, a threaded spindle within said tool spindle, a rotary nut connected with said tool spindle and situated within the tool spindle, said threaded spindle meshing with said nut, a gear drive including a coupling connected with said nut, means connected with said coupling for actuating the same, another gear drive having a different transmission ratio and including another coupling connected with said threaded spindle, means connected with the second-mentioned coupling for actuating the same, and a rotary steering disc having cam surfaces engaged by the means actuating the two couplings, whereby a rotation of said steering disc causes an engagement and disengagement of said couplings.

17. A drill, comprising a hollow tool spindle, a threaded spindle within said tool spindle, a rotary nut connected with said tool spindle and situated within the tool spindle, said threaded spindle meshing with said nut, a gear drive including a coupling connected with said nut, means connected with said coupling for actuating the same, another gear drive having a different transmission ratio and including another coupling connected with said threaded spindle, means connected with the second-mentioned coupling for actuating the same, means operatively interconnecting the means actuating the two couplings, and manually operated means for interrupting the operative connection between the two couplings.

18. A drill, comprising a hollow tool spindle, a threaded spindle within said tool spindle, a rotary nut connected with said tool spindle and situated within the tool spindle, said threaded spindle meshing with said nut, a gear drive including a coupling connected with said nut, means connected with said coupling for actuating the same, another gear drive having a different transmission ratio and including another coupling connected with said threaded spindle, means connected with the second-mentioned coupling for actuating the same, a steering disc having cam surfaces engaged by the means actuating the two couplings, means connected with said disc for manually turning the same to cause an engagement and disengagement of said couplings, and resilient means connected with said disc for returning it to a neutral position.

19. A drill, comprising a hollow tool spindle, two interengaging rotary driving elements situated within said hollow tool spindle, one of said elements being operatively connected with said spindle, separate means connected with said driving elements for simultaneously rotating them with different speeds to cause said one element and said tool spindle to carry out a feed movement, means stopping the rotation of the other one of said elements to cause said one element and said tool spindle to carry out a quick return movement, a casing enclosing said tool spindle and having a plurality of openings formed therein, and means extending through at least some of said openings and engaging said tool spindle for rotating the same.

WILHELM SCHWENECKE.